United States Patent [19]

Veijanen

[11] Patent Number: 5,658,598
[45] Date of Patent: Aug. 19, 1997

[54] SECONDARY COATING LINE

[75] Inventor: Paavo Veijanen, Helsinki, Finland

[73] Assignee: Nokia-Maillefer Oy, Finland

[21] Appl. No.: 501,035

[22] PCT Filed: Dec. 30, 1994

[86] PCT No.: PCT/FI94/00590

§ 371 Date: Aug. 9, 1995

§ 102(e) Date: Aug. 9, 1995

[87] PCT Pub. No.: WO95/18396

PCT Pub. Date: Jul. 6, 1995

[30] Foreign Application Priority Data

Dec. 31, 1993 [FI] Finland ............ 935955

[51] Int. Cl.$^6$ ............ B29C 47/90
[52] U.S. Cl. ............ 425/113; 425/114; 425/145; 264/40.7; 264/45.9
[58] Field of Search ............ 425/113, 114; 264/40.1, 40.6, 40.7

[56] References Cited

U.S. PATENT DOCUMENTS

| | | | |
|---|---|---|---|
| 4,229,392 | 10/1980 | Shimano et al. | 425/162 |
| 4,536,365 | 8/1985 | Zwick | 264/558 |
| 4,585,603 | 4/1986 | Furuta et al. | 264/40.6 |
| 4,592,881 | 6/1986 | Kyriakis | 425/140 |
| 4,744,930 | 5/1988 | Twist et al. | |
| 5,084,227 | 1/1992 | Vancoppenolle et al. | |
| 5,151,147 | 9/1992 | Foster et al. | |
| 5,213,689 | 5/1993 | Kafchinski et al. | 210/500.23 |
| 5,494,623 | 2/1996 | Sato et al. | 425/140 |

FOREIGN PATENT DOCUMENTS

| | | |
|---|---|---|
| A2 0 286 819 | 3/1988 | European Pat. Off. |
| 3822566 A1 | 11/1990 | Germany. |
| 2 167 703 A | 6/1986 | United Kingdom. |

*Primary Examiner*—Jay H. Woo
*Assistant Examiner*—Iurie A. Schwartz
*Attorney, Agent, or Firm*—Nixon & Vanderhye P.C.

[57] ABSTRACT

A secondary coating line for producing a secondary-coated optical fibre or bundle of fibres, the line including a feeding apparatus with a feed roll for feeding an optical fibre or bundle of fibres; an extruder for extruding an oversize secondary jacket around the fibre or bundle of fibres; a cooling apparatus for cooling the extruded secondary jacket, the distance between the extruder and the point where the cooling apparatus starts to cool being adjustable; and a winding apparatus for winding the finished secondary-coated fibre or bundle of fibres on a take-up roll. To maintain the high quality of the final product even as the line speed changes, the secondary coating line of the invention further including means for determining the point where the cooling apparatus starts to cool, means for determining the speed of the finished secondary-coated fibre or bundle of fibres, and means for adjusting the point where the cooling apparatus starts to cool in accordance with the speed of the finished secondary-coating fibre or bundle of fibres.

3 Claims, 1 Drawing Sheet

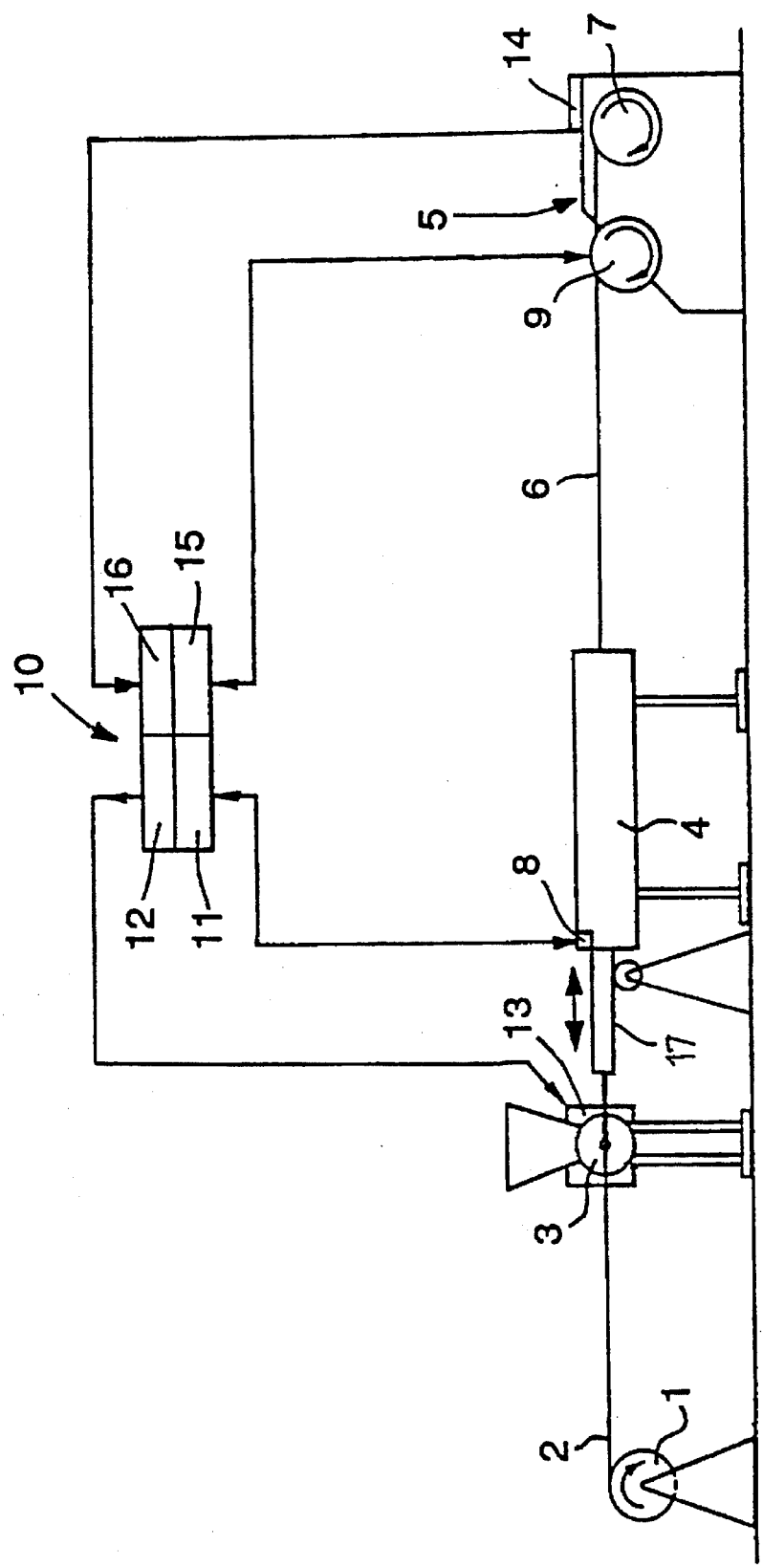

SECONDARY COATING LINE

BACKGROUND

The invention relates to a secondary coating line for producing a secondary-coated optical fibre or bundle of fibres, the line comprising a feeding apparatus with a feed roll for feeding an optical fibre or bundle of fibres; an extruder for extruding an oversize secondary jacket around the fibre or bundle of fibres; a cooling apparatus for cooling the extruded secondary jacket, the distance between the extruder and the point where the cooling apparatus starts to cool being adjustable; and a winding apparatus for winding the finished secondary-coated fibre or bundle of fibres on a take-up roll.

A conventional secondary coating line with the basic structure described above is known e.g. from Finnish Patent 75,939, or corresponding British Patent Application 2,141, 557. Conventionally, secondary coating lines like this have been controlled so that a product produced during the starting and speeding up of the line has not met the quality requirements. The reason for this is that when the speed of the line changes, the characteristics of the produced secondary coating also change; not until the normal running speed is achieved does the secondary coating reach the desired values. A rather large amount of valuable optical fibre has thus been wasted.

Alternatively, optical fibres have not been thread into the tube provided by the secondary jacket until the production speed has been achieved. Plastic waste has been produced, and the production speed must have been adjusted to be so slow that it has been possible to thread the optical fibres into the secondary jacket at that rate.

When optical fibres are thread into the secondary jacket at a rate that is slower than the normal running speed, the poor quality of the product is at least primarily due to the fact that the distance between the cooling apparatus and the extruders has not been suitable considering the rate. In practice, the plastic melt outlet from the press head forms after the press head a conical part in which the secondary jacket tube is drawn to its final measurements. If the water cooling conducted in the cooling apparatus is started at the conical part, the result is a brittle tube, i.e. the tensile strength of the tube in a tension test is small. If on the other hand the distance between the press head and the water cooling is too long, the hot plastic may run, causing faults in shape and variation in diameter. As the line speed increases, the tension cone following the press head becomes larger; by suitably adjusting the line speed, it has thus been possible to make the measurements of the secondary jacket comply with the quality requirements.

In secondary coating, the type of plastic from which a secondary jacket is produced must also be taken into account. Since different plastic types have different characteristics, they behave differently in an extruder, and so the plastic melt also behaves differently and the line speed must be suitable in order that it might be possible to achieve the desired measurements.

SUMMARY OF THE INVENTION

The object of the present invention is to provide a new kind of secondary coating line by which the quality of the secondary-coated optical fibre or bundle of fibres can be maintained high irrespective of the plastic type used, the line speed, or possible controlled changes in the line speed during the production process. This is achieved with the secondary coating line of the present invention, which is characterized by comprising means for determining the point where the cooling apparatus starts to cool, means for determining the speed of the finished secondary-coated fibre or bundle of fibres, and means for adjusting the point where the cooling apparatus starts to cool in accordance with the speed of the finished secondary-coated fibre or bundle of fibres.

Thus the basic idea of the present invention is that if the point where the cooling is started is adjusted in accordance with the line speed, the final product always meets the quality requirements, irrespective of the line speed. Advantageously, the means for adjusting the point where the cooling apparatus starts to cool comprise a first memory means for storing product-specific secondary jacket data about the desired point for starting the cooling operation of the cooling apparatus at various speeds of the finished secondary-coated fibre or bundle of fibres. On the basis of the information obtained during the trial runs, it is possible to determine the conditions—which are dependent on the plastic type used and the desired measurements of the final product—under which a product with the desired characteristics is obtained. Accordingly, on the basis of the product specifications, it is thus possible to determine the point where the cooling is to be started, when the line speed is known.

In order that all the possible factors affecting the quality of the product might be controlled, the secondary coating line of the invention advantageously also comprises a second memory means for storing product-specific secondary jacket data about the throughput of the extruder at different rotation rates of the pressing screw of the extruder, and means for adjusting the rotation rate of the pressing screw of the extruder to produce the desired throughput at various speeds of the finished secondary-coated fibre or bundle of fibres. This makes it possible to take into account any non-linearities of the operation of the extruder and to eliminate their effect.

In accordance with the above, the secondary coating line of the invention makes it possible to reduce and increase the line speed without impairing the quality of the product. For optimal utilization of this characteristic, the line further comprises means for determining the length of a finished secondary-coated fibre or bundle of fibres wound on a take-up roll, and means for decelerating the speed of a finished secondary-coated fibre or bundle of fibres to a roll change speed as the desired length has been wound, and for accelerating it back to the normal speed after the change of rolls.

In the following, the secondary coating line of the invention will be described in greater detail with reference to the attached drawing, which shows a schematic general view of a secondary coating line according to the invention.

BRIEF DESCRIPTION OF THE DRAWINGS

The figure shows a secondary coating line according to the invention.

DETAILED DESCRIPTION OF THE DRAWINGS

For the sake of clarity, only those elements of the secondary coating line that are significant to the operation are shown in the figure. For example, elements conventionally contained in secondary coating lines such as a tension apparatus for directing a desired tensile force to the secondary jacket, or an apparatus connected with the extruder for feeding grease through the extruder into the secondary jacket so that it fills the jacket, or different measuring devices for measuring e.g. the diameter of the product are not depicted. Conventional line elements of this kind are disclosed e.g. in above-mentioned Finnish Patent 75,939 and corresponding British Patent Application 2,141,557.

Basically, a secondary coating line according to the invention as shown in the figure comprises a feeding apparatus with a feed roll 1 for feeding an optical fibre or bundle of fibres 2, an extruder 3 for extruding an oversize secondary coating around the fibre or bundle of fibres 2, a cooling apparatus 4 for cooling the extruded secondary jacket, and a winding apparatus 5 for winding the finished secondary-coated fibre or bundle of fibres 6 on a take-up roll 7. As shown in the figure, the secondary coating line according to the invention further comprises a control computer 10 that contains storage areas and processors for performing different tasks. The control computer 10 comprises a storage area 11, in which the points where the cooling apparatus 4 starts to cool at various line speeds are stored. A block 15 of the control computer 10 obtains the data indicating the line speed e.g. from a wheel 9 connected with the winding apparatus 5. Naturally, all conventional arrangements for measuring the line speed are suited for the purpose. On the basis of the measured line speed and the 'recipe-specific' data in the storage area 11, an actuator 8 of the control computer 10 controls the cooling chute 17 that is connected with the cooling apparatus 4 and has e.g. a telescopic structure, so that the distance between the cooling chute 17 and the extruder 3 is as desired. The cooling conditions of the secondary jacket can thus be held constant 30 irrespective of the length of the tension cone of the extruded secondary jacket, the length in turn depending on the desired measurements of the final product, the material of the secondary jacket, and the line speed.

To control the position of the telescopic part 17 of the cooling chute, the control computer 10 naturally also needs information about the current position of the telescopic part, i.e. the point where the cooling is started. The control computer 10 obtains this information by conventional sensors in connection with the actuator 8. On the basis of both the point where the cooling is started and the line speed, and using the data stored in the memory means 11 concerning the product-specific point of the secondary jacket where the cooling operation of the cooling apparatus is to be started at various line speeds, the control computer 10 is able to give the actuator 8 a signal that moves the telescopic part 17 to the desired direction. Since the actuator 8 performs a continuous sensing operation, the control computer is continuously informed of the position of the telescopic part, and so the control computer can continuously modify the position of the telescopic part in accordance with the line speed. The modification can be performed so quickly that it is possible to start the line at a very low speed and even at this speed to meet the quality requirements set to the product, and further to accelerate the line until it reaches the desired speed without impairing the quality of the product.

In the secondary coating line of the invention, it is also possible to take into account that the operation of the extruder may be non-linear. Accordingly, the control computer 10 comprises a second storage area or memory means 12 for storing the product-specific secondary coating data about the throughput of the extruder at different rotation rates of the pressing screw of the extruder. In order that the throughput of the extruder 3 might be made to comply with the varying line speeds, the control computer 10 comprises suitable software which—after receiving data about the line speed—gives the actuator 13 that adjusts the rotation rate of the pressing screw of the extruder a control signal that product-specifically sets the rotation rate of this pressing screw to the desired value at the various line speeds. This rectification of possible non-linearities of the extruder further enhances the operation of the line especially in situations where the line speed varies within a relatively large range.

The characteristic of the secondary coating line according to the invention—that the line is able to produce a final product that meets the quality requirements irrespective of the line speed—is also. advantageous with respect to continuous operation: instead of a conventional double winder, the line can now be provided with a much cheaper single winder, since the change of rolls does not require that the line should be stopped. Accordingly, the winding apparatus 5 of the described line has an actuator 14, typically a separate production line actuator, measuring the length of the final product of the secondary coating line wound on the take-up roll 7. The data indicating the wound length is sent to a block 16 of the control computer; by a program contained in the block and by utilizing other storage areas and processors of the computer 10, the speed of the secondary coating line can be decelerated to a roll change speed as the desired length has been wound, and accelerated back to the normal speed after the change of rolls. According to the invention, when the length of the product wound on the take-up roll reaches the desired value, block 16 of the control computer 10 can, if desired, slow the line speed down to a point where the take-up roll 7 can be changed in a single winder even without an accumulator. When the take-up roll has been changed, block 16 controlledly accelerates the line speed back to the normal running speed; the production process has not been interrupted, nor has the quality of the product been impaired in any way by the change of rolls or associated changes in the speed.

The secondary coating line of the invention has been described above by means of one illustrative and schematic solution, but it is to be understood that the line can be modified in many ways according to the need and that additional elements can be added without departing from the scope of the attached claims.

I claim:

1. A secondary coating line for producing a secondary-coated optical fibre or bundle of fibres, the line comprising:

a feeding apparatus with a feed roll for feeding an optical fibre or bundle of fibres, an extruder for extruding an oversize secondary coating around the fibre or bundle of fibres, a cooling apparatus for cooling the extruded secondary coating, the distance between the extruder and the point where the cooling apparatus starts to cool being adjustable;

a winding apparatus for winding the finished secondary-coated fibre or bundle of fibres on a take-up roller;

means for determining the point where the cooling apparatus starts to cool;

means for determining the speed of the finished secondary-coated fibre or bundle of fibres; and means for initially setting and subsequently adjusting the position where the cooling apparatus starts to cool in accordance with the speed of the finished secondary-coated fibre or bundle of fibres, said means comprising a first memory means for storing product-specific secondary coating data including points for starting the cooling operation of the cooling apparatus at various speeds of specific finished secondary-coated fibres or bundles of fibers, said data determining the initial position of the cooling apparatus.

2. A secondary coating line according to claim 1 and further comprising a second memory means for storing product-specific secondary jacket data including extruder throughput at different rotation rates of the pressing screw of the extruder, and means for adjusting the rotation rate of the pressing screw of the extruder to produce the desired throughput at various speeds of the finished secondary-coated fibre or bundle of fibres.

3. A secondary coating line according to claim 1 and further comprising means for determining the length of a finished secondary-coated fibre or bundle of fibres wound on a take-up roll, and means for decelerating the speed of a finished secondary-coated fibre or bundle of fibres to a roll change speed as the desired length has been wound, and for accelerating it back to the normal speed after the change of rolls.

* * * * *